UNITED STATES PATENT OFFICE.

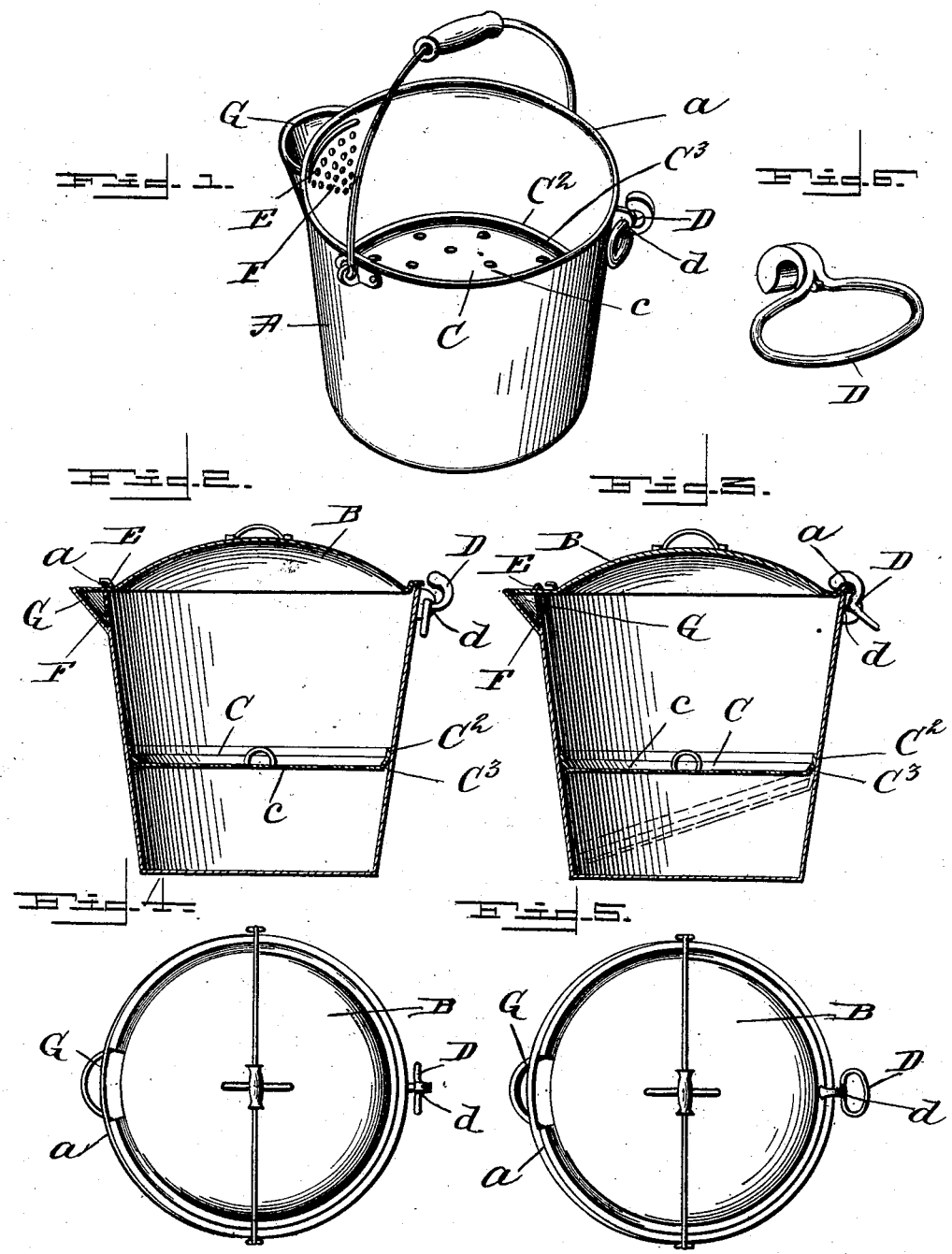

AUGUST W. OBERMANN, OF PITTSBURG, PENNSYLVANIA.

COOKING UTENSIL.

SPECIFICATION forming part of Letters Patent No. 507,281, dated October 24, 1893.

Application filed May 23, 1892. Serial No. 434,017. (No model.)

*To all whom it may concern:*

Be it known that I, AUGUST W. OBERMANN, a citizen of the United States of America, residing at Pittsburg, in the county of Allegheny and State of Pennsylvania, have invented certain new and useful Improvements in Cooking-Vessels, of which the following is a specification, reference being had to the accompanying drawings.

This invention relates to culinary vessels and particularly to that class known as cooking vessels.

This invention is an improvement on my former patents granted to me March 7, 1882, No. 254,500; January 19, 1886, No. 334,459; September 21, 1886, No. 349,317; November 20, 1888, No. 393,025; December 31, 1889, No. 418,216, respectively.

This invention has for its object to produce a practical and cheap cooking-vessel of such construction that the water can be drained from the article being cooked without the necessity of lifting the cover from the vessel; furthermore, to allow the steam to escape when the articles are being cooked.

This invention has for its still further object the provision of novel means whereby cooking can be carried on with much greater facility than heretofore, and consists in the novel arrangement and combination of parts more fully hereinafter described and specifically pointed out in the claims.

With these objects in view the invention consists of a perforated steamer having a beveled double flanged portion at its periphery and so constructed as to tightly fit in the interior of the vessel.

This invention still further consists in the novel construction of the operating handle for the purpose of opening and closing the lid or cover; furthermore, the invention consists in the employment of suitable means to hold said cover in position.

Referring to the accompanying drawings forming a part of this specification wherein like letters of reference indicate similar parts.

Figure 1, is a perspective view illustrating my improved cooking vessel. Fig. 2, is a vertical sectional view showing the cover in a closed position over the vessel. Fig. 3, is a vertical sectional view showing the cover drawn back and the vessel open sufficiently to allow draining and the escape of steam. Fig. 4, is a top plan view showing the vessel closed, same as illustrated in Fig. 2. Fig. 5, is a top plan view corresponding to Fig. 3, as will be readily understood. Fig. 6, is a detail perspective view of the operating handle.

A, represents the vessel; $a$, the rim or annular flange; B, the cover; C, the steamer; $c, c, c$, &c., the perforations in same; $C^2$, the outer flange of steamer; $C^3$, the inner flange of steamer; D, the operating handle pivoted at $d$.

E, represents the aperture formed in the vessel near top and directly above strainer.

F,—G represents the spout formed at the top of vessel as shown.

Operation:—When it is desired to use the vessel, victuals are placed in the water at the bottom of vessel and covered by the steamer, and in this connection, I wish to call particular attention to the fact that said steamer can be used to a great advantage: *i. e.*, it acts as a partition to divide different victuals. For example, when it is desired to boil meat in the lower portion of the vessel potatoes or the like may be placed on the steamer and thus it will be readily seen that both articles can be cooked at the same time. When it becomes necessary to drain the water from the vessel the operator lifts the vessel by the handle with left hand which leaves the right free to manipulate the handle which engages with the cover and draws it back a sufficient distance to allow the water and steam to escape; and in this connection particular attention is called to the operating handle which is so formed as to engage in its operation with the flanged portion of the lid or cover and thereby withdrawing its projecting portion from over the spout a sufficient distance to allow the water to drain and steam to escape as shown in Figs. 3 and 5 of the drawings. If it is advantageous to place the victuals on one side of the vessel the steamer may be tilted, as shown in dotted lines in Fig. 3 of the drawings.

The rim on top of vessel is so formed as to coincide with that of the lid or cover, it is so constructed however as to allow enough room or play as to effectually operate as heretofore described.

The steamer is made of one piece preferably tin and the outer flange is so constructed as to permit a perfect adjustment to the sides of the vessel and hold it firmly in position. This vessel may be constructed of any suitable material but what is known as the agate or enameled ware is the most desirable.

Having fully described my invention, what I claim, and desire to secure by Letters Patent, is—

1. The combination of a vessel having a spout in its upper edge, a cover for said vessel provided with an extension which serves as a cover for the spout and having a peripheral flange bent upward and outward and extending over the upper edge of the vessel, and an operating handle pivotally secured on side the vessel and provided with a hook-like portion which is adapted for engaging the flange of the cover, all parts operating substantially as described.

2. The combination of a vessel having an open top spout and an aperture E, a cover for the vessel having at one edge a projection which serves as a cover for the spout and provided with a peripheral flange bent upward and outward and extending over the upper edge of the vessel and an operating handle pivoted to the outer upper side of the vessel opposite the spout and provided with a hooked portion which is adapted for engaging the flange of the cover, substantially as described.

3. The combination of a vessel having an open top spout at its upper edge, a closely fitting cover for said vessel having at one edge an extension which serves as a cover for the spout, and provided with a peripheral flange bent upward and outward and extending over the upper edge of the vessel, and the locking handle pivoted to the outer side of the vessel opposite the spout, and provided with a hooked portion which is adapted to pass over the flange of the cover, the distance from the tip of the spout cover, to the edge of the vessel cover, which is opposite thereto, being less than the distance from the tip of the spout to the upper edge of the vessel, which is opposite.

In testimony whereof I affix my signature in presence of two witnesses.

AUGUST W. OBERMANN.

Witnesses:
R. C. OEHMLER,
GEORGE JAEGER.